March 6, 1934.  C. D. BAILEY  1,949,950
CLUTCH MECHANISM
Filed Nov. 25, 1930    5 Sheets-Sheet 1

INVENTOR
Curtis D. Bailey
BY
Munn&Co
ATTORNEY

March 6, 1934.    C. D. BAILEY    1,949,950
CLUTCH MECHANISM
Filed Nov. 25, 1930    5 Sheets-Sheet 2
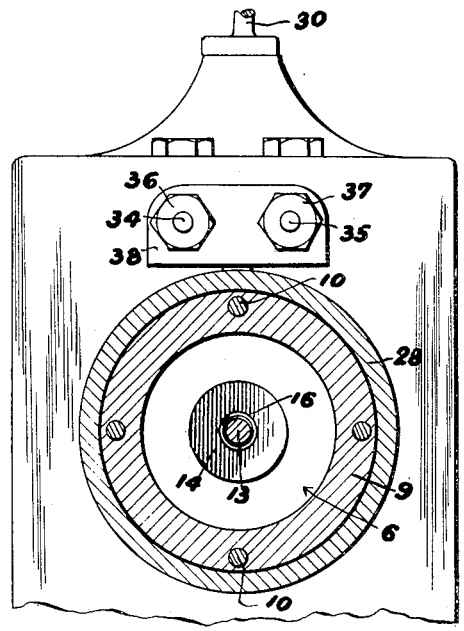
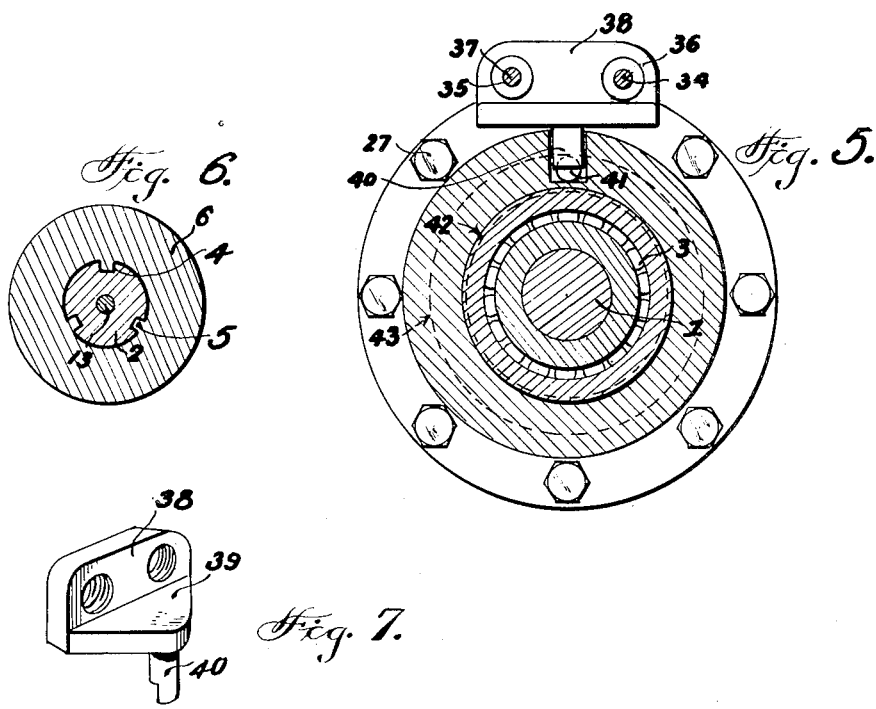
INVENTOR
Curtis D. Bailey
BY
ATTORNEY March 6, 1934.   C. D. BAILEY   1,949,950
CLUTCH MECHANISM
Filed Nov. 25, 1930   5 Sheets-Sheet 3

INVENTOR
Curtis D. Bailey.
BY
ATTORNEY

March 6, 1934.  C. D. BAILEY  1,949,950
CLUTCH MECHANISM
Filed Nov. 25, 1930   5 Sheets-Sheet 4
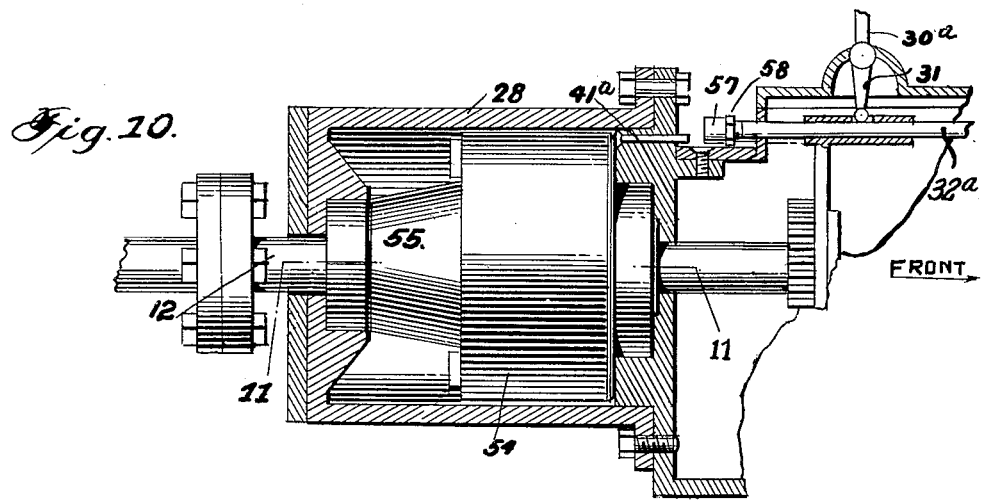
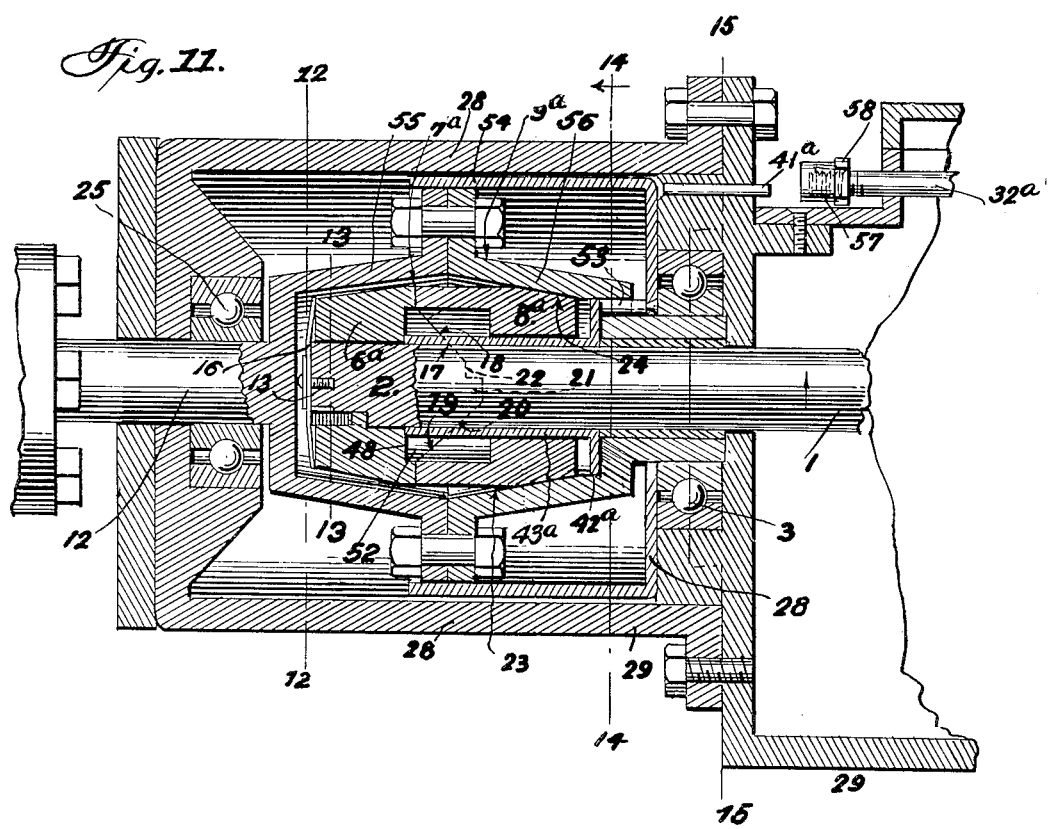
INVENTOR
Curtis D. Bailey.
BY
ATTORNEY

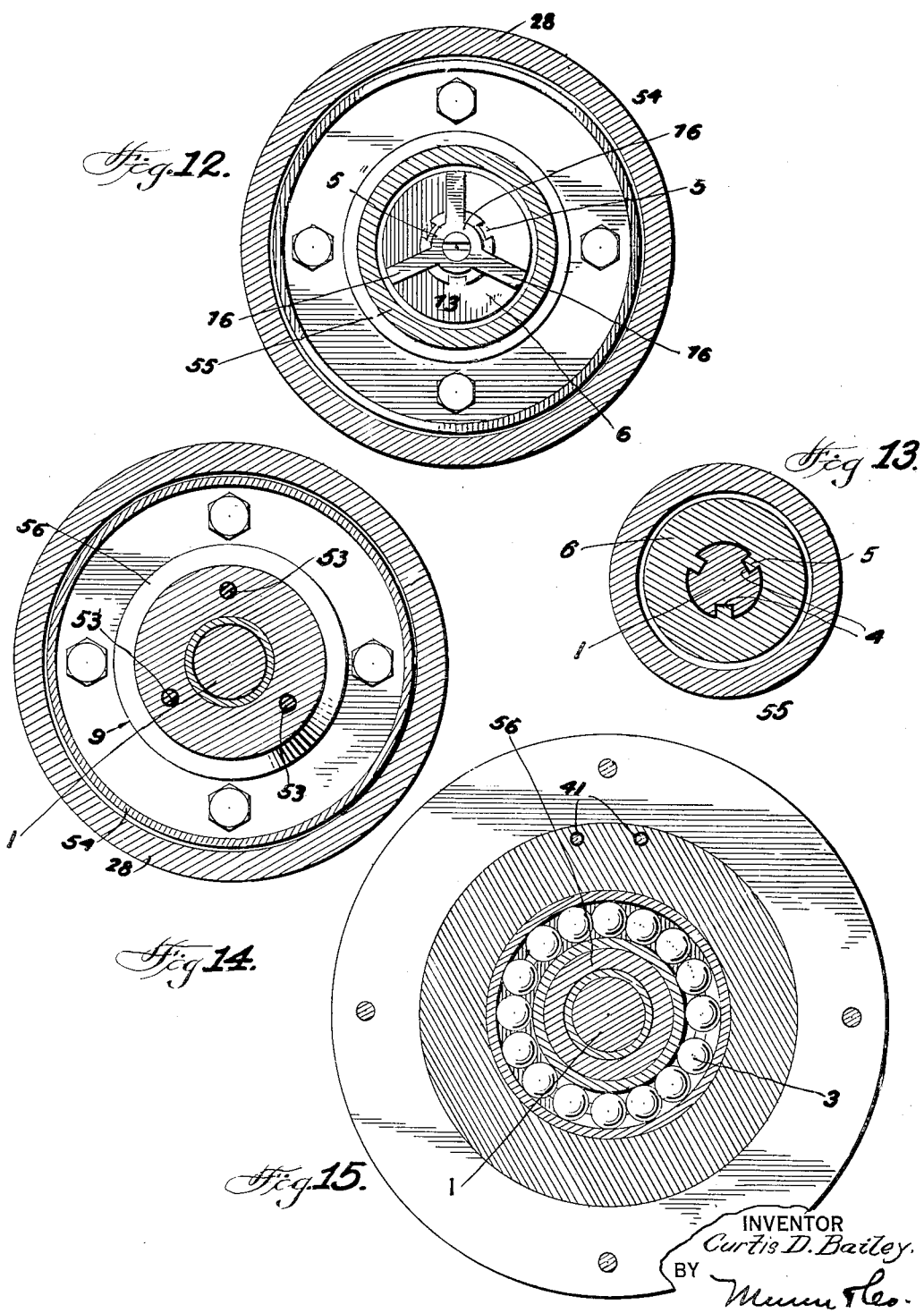

Patented Mar. 6, 1934

1,949,950

UNITED STATES PATENT OFFICE 1,949,950

CLUTCH MECHANISM

Curtis D. Bailey, Massillon, Ohio

Application November 25, 1930, Serial No. 498,159

12 Claims. (Cl. 74—59)

This invention relates to improvements in clutch mechanism and it consists in the constructions, combinations and arrangements herein described and claimed.

An object of the invention is to provide a so-called "free wheeling" clutch, the specific purpose of which is to enable the free rolling movement of the vehicle by virtue of its momentum when the speed of momentum exceeds that to which the vehicle would be driven if the engine remained coupled to the drive wheels.

Another object of the invention is to provide a free wheeling clutch by means of which driving power from an engine may be transmitted to the drive wheels, but which prevents the driving of the engine by the vehicle when the momentum of the latter exceeds the speed that the vehicle would be subject to if driven by the engine.

A further object of the invention is to provide a free wheeling clutch which will enable the vehicle speed to over-run the deliverable engine speed.

Another object of the invention is to provide a free wheeling clutch mechanism which includes means enabling locking of the engine to the vehicle under selected conditions, for example, as when driving in second and reverse gears, the advantage of this locking function while in second gear being the utilization of the braking power of the engine as an auxiliary to the service brakes.

A further object of the invention is to provide a clutch such as described which can be operated to enable the vehicle to free wheel in all forward speeds and lock the engine to the vehicle in reverse speed only.

Figure 1:
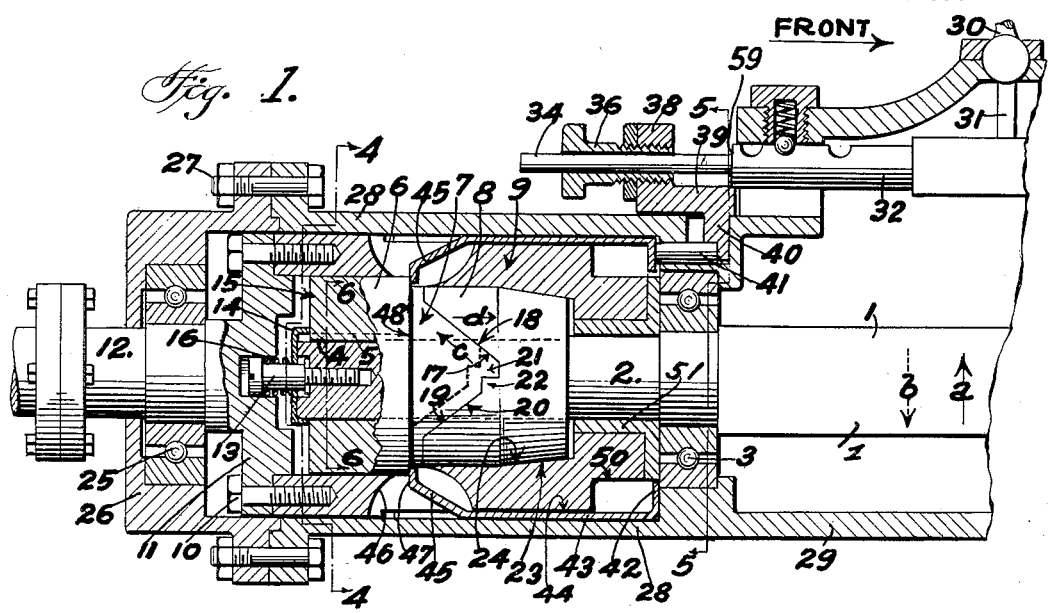
Figure 2:
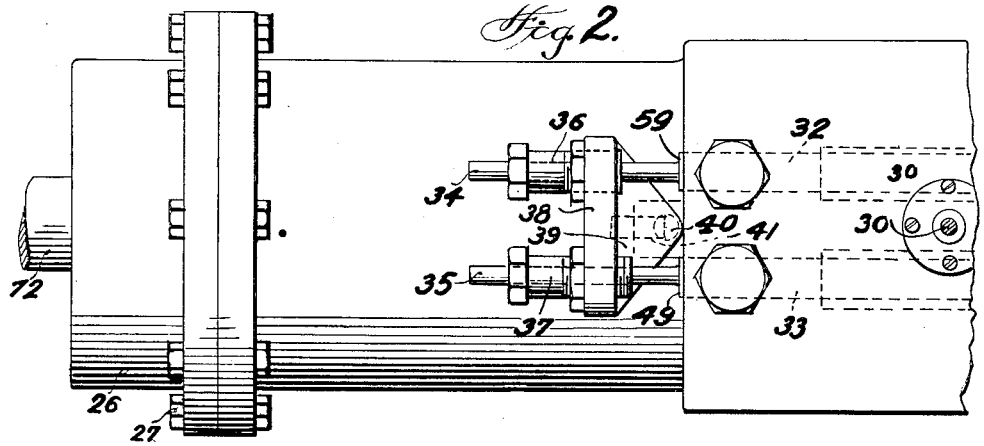
Figure 3:
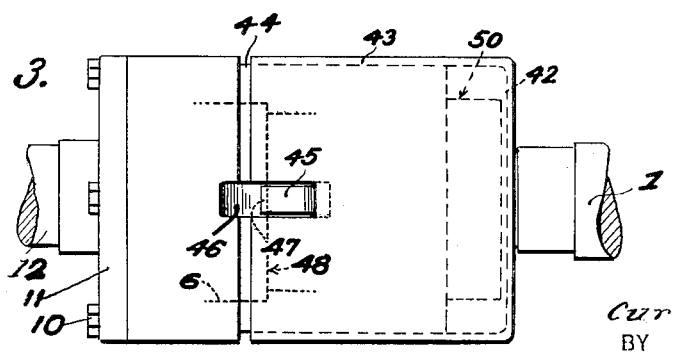
Figure 8:
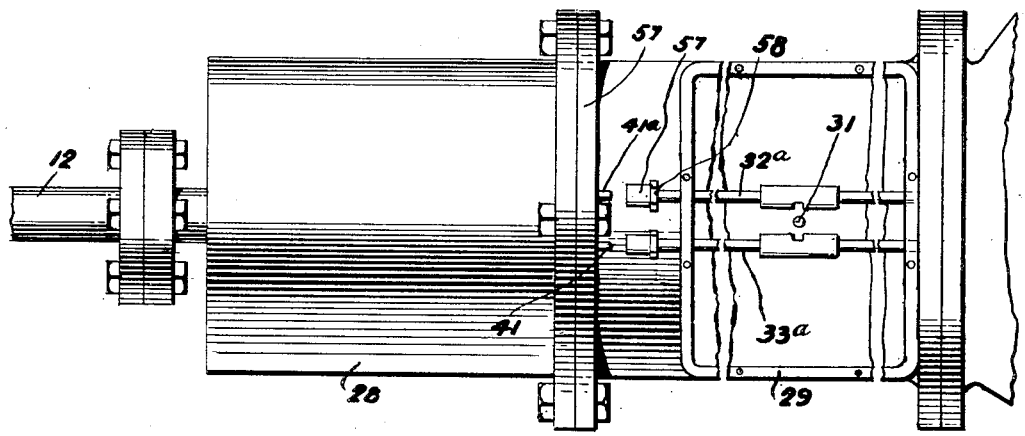
Figure 9:
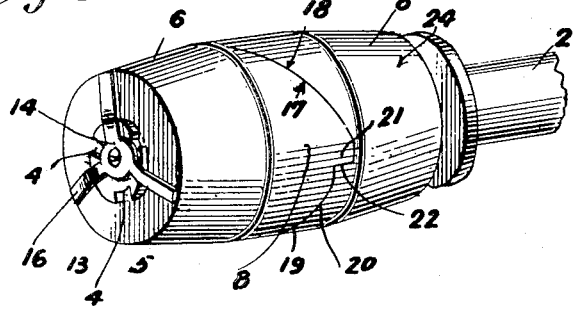

Other objects and advantages will appear in the following specification, reference being had to the accompanying drawings, in which:

Figure 1 is a vertical longitudinal section of the improved free wheeling clutch, parts being shown in elevation, the position being neutral, Figure 2 is a plan view of the structure shown in Figure 1, Figure 3 is a detail view of the internal coupling element, Figure 4 is a cross section taken on the line 4—4 of Figure 1, Figure 5 is a cross section taken on the line 5—5 of Figure 1, Figure 6 is a detail cross section taken on the line 6—6 of Figure 1, Figure 7 is a detail perspective view of a shift block, later referred to, Figure 8 is a plan view of the power transmission system of a motor vehicle, embodying a free wheeling clutch of a somewhat modified design, Figure 9 is a perspective view of the coupling head of the modified clutch, this coupling head being essentially the same as the one shown in partial elevation in Figure 1, Figure 10 is a vertical longitudinal section of the clutch in Figure 8, parts being shown in elevation, Figure 11 is a longitudinal section taken substantially on the line 11—11 of Figure 10, parts being shown in elevation, Figure 12 is a cross section taken on the line 12—12 of Figure 11, Figure 13 is a cross section taken on the line 13—13 of Figure 11, Figure 14 is a cross section taken on the line 14—14 of Figure 11, and Figure 15 is a cross section taken on the line 15—15 of Figure 11.

This disclosure embodies what might be called two forms of the invention of which Figs. 1 and 11 are representative. However, both forms are fundamentally the same in principle, there being only slight structural changes which make possible a variation in second gear. This variation is briefly explained thus: According to the arrangement in Fig. 1 the engine (not shown) may either be locked or not locked with the vehicle in second gear. According to the arrangement in Fig. 11, the engine will be locked with the vehicle unless certain shift pins are omitted from the structure in the original assemblage.

The description first applies to the arrangement in Figs. 1 to 7, but all similar parts in Figs. 8 to 15 are designated by corresponding numerals with exponent letters "a", thus to avoid needless duplication in the later description of the second form. The main drive shaft 1 (Fig. 1) extends at 2 for about 5" past the rear transmission ball bearing 3, and approximately 1½" of the end of the extension is splined at 4 (Fig. 6) in order to slidably receive the ribs or keys 5 of the drive component 6 of a coupling head or coupling means 7 so as to be movable with the drive shaft 1.

The other component 8 (Fig. 1) of this coupling head is loose on the extension 2, but always has frictional contact of some degree with a coupling element generally designated 9. This element 9 is secured at the rear end at 10 to a plate 11 of the driven or propeller shaft 12. This shaft has connection with the drive wheels (not shown) of the vehicle, the purpose being to drive such wheels from the shaft 1 through the instrumentality of the coupling head 7 and element 9, the pecularity of this head and element being the permissible overrunning of the vehicle when the momentum thereof exceeds the speed to which it would be driven if the engine remained coupled.

A screw 13 (Fig. 1), permanently secured in the rear end of the extension 2, retains a spring-loaded cup 14 which always maintains intimate contact with the base 15 of the drive component 6. The tendency of the spring 16 is to press and slide the drive component 6 in one direction (forward) along the extension 2, although the spring 16 is overcome at times when the component 6 is forced in the opposite direction (rearward) by action of the cam face 17 against the corresponding cam face 18 of the component 8.

At this point it may be well to say that companion cam faces 19—20 (Fig. 1), respectively of the components 6 and 8 and comprising separating means therefor, are adapted to perform the same diverse motion of the component 6 upon a reversal of the main shaft 1, as when in reverse gear, after the interlocking teeth 21—22 have been disengaged for the purpose. These teeth, as well as the set of cam faces 17, 18, etc., are duplicated on the other side of the coupling head 7. The action of the duplicated structure is identical with that on the near side (Fig. 1).

The pressure of the spring 16 (Fig. 1) tends to keep the drive component 6 in contact with its companion 8 which, in turn, always maintains a frictional contact with the tapering wall 23 of the chamber in the element 9 which it occupies. The component 8 has a correspondingly tapering end 24, the degree of the taper being considerably less than the angles of the cam faces 17, 19.

This frictional contact of the component 8 with the element 9 is always even when the vehicle is free wheeling, but the degree or extent of the frictional contact varies from a tight wedging fit, as when the main shaft 1 drives the propeller shaft 12, to a light frictional contact, as when the coupling head 7 idles within the coupling element 9.

The differences in taper between the cone 24 (Fig. 1) and the cam faces 17, 18, etc., enable a quick grip of the coupling element 9 by the component 8 and a slipping of the drive component 6 in reference to the component 8 when the main shaft 1 is driven clockwise (arrow $a$, Fig. 1) and also when the main shaft is driven counter-clockwise (arrow $b$, Fig. 1) as when driving in reverse. In practice, the taper of the cone 24 is about 18°, while the taper or inclination of the faces 17, 19 is about 55°.

Thus far it will be understood that when the cam faces 17, 18 (Fig. 1) act against each other, in the clockwise turning of the shaft 1, (arrow $a$, Fig. 1) there will be an axial separation of the components 6, 8 with a consequent driving of the base 15 against the plate 11 and driving of the component 8 hard against the tapering wall 23. The grip thus afforded enables a transmission of the driving power of the shaft 1 through the coupling head 7 to the coupling head 9, thence to the propeller shaft 12 and finally to the drive wheels of the vehicle. A ball bearing 25 (Fig. 1) supports the forward end of the propeller shaft 12 in respect to a cap 26 that is secured at 27 over the open rear end of a casing 28 that is an extension of the transmission gear case 29. This case contains a train of gears (only fractionally shown in Fig. 10) which is adjustable to various combinations by means of a shift lever 30 (Fig. 1) in order to derive the familiar first, second, third and reverse speeds.

The standard gear shift is taken herein for illustration, and although this is familiar to all persons driving the majority of modern automobiles, it may be stated for the purpose of this disclosure, that the top free end of the lever 1 is shifted as follows in order to arrive at the foregoing gear combinations:

1st speed, shift lever left and back.
2nd speed, shift lever right and forward.
3rd speed, keep lever right and shift back.
Reverse speed, shift lever left and forward.

In thus shifting the lever 30 the working end 31 (Fig. 1) acts between and upon a pair of shift rods 32, 33 (Fig. 2). Extensions 34, 35 (Fig. 2) of these rods ride in bushings 36, 37 which are screwed or otherwise adjustably fitted in the flange 38 of a shift block 39 (Fig. 7). The bushing 36 is shorter than the bushing 37 (Fig. 2) therefore preventing the shift rod 32 from shifting the block 39 in the ordinary movement of the lever 30 into second gear position. This shift block has a depending stud 40 which engages one end of a shift pin 41.

The other end of the shift pin 41 (Fig. 1) engages the flange 42 of a sleeve 43 that partially encases the coupling element 9. This element is annularly recessed at 44 (Fig. 3) to receive the sleeve 43. The depth of the recess is approximately equal to the thickness of the sleeve so that the outer surfaces come flush and snugly fit the casing 28 in which these parts are revoluble.

To the latter end the sleeve 43 has tongues 45 pressed into depressions 46 in the element 9 (Fig. 1). This arrangement provides a simple yet effective mode of connecting the sleeve 43 with its coupling element 9. But in addition to the coupling function the tongues 45 also have the purpose of shifting the drive component 6 as when desiring to disengage the interlocking teeth 21, 22.

Such disengagement would occur either upon shifting the lever 30 into reverse, and it may be made to occur when said lever is shifted into the second speed position. For this purpose the tongues 45 have pushers 47 which engage an annular shoulder 48 on the drive component 6. Thus far it can be seen that a movement of the lever 30 to reverse (left and forward) will establish connection of the working end 31 (Fig. 1) with the shift rod 33 (Fig. 2) and shift the latter rearwardly until the shoulder 49 (Fig. 2) abuts the bushing 37 and displaces the block 39 rearwardly. Motion is then transmitted by way of shift pin 41 to the sleeve 43, thence to the drive component 6 so that this is shifted to the dotted line position (Fig. 1) wherein the formerly interlocking teeth 21, 22 are out of registration.

An annular reduction 50 (Fig. 1) in the element 9 makes room for the flange 42. A bearing sleeve 51 supports the forward end of the element 9 on the extension 2. The flange of this sleeve abuts the ball bearing 3 previously alluded to.

Reference is next made to the modification. The arrangement of the coupling head 7, in so far as the cam faces 17, 18, 19, 20 and the interlocking teeth 21, 22 are concerned (Fig. 9) is identical with Fig. 1. In lieu of the shoulder 48 being located on the outside of the component 6, the latter is now made hollow at 52 (Fig. 11), thus locating the shoulder 48$^a$ internally and accessible by an equivalent sleeve 43$^a$ which now comes next to the extension 2. The flange 42$^a$ of this sleeve is acted upon by studs 53 that are carried by a cylindrical cup 54 which comprises an extra element; that is to say, an element which has no direct equivalent in Fig. 1. The slidable shift pin 41ª (Fig. 11) is now duplicated (Fig. 8) so that there is one behind each of the shift rods 32ª—33ª.

Upon shifting the lever 30ª to reverse, (left and forward) the shift rod 33ª would press against the respective pin 41ª and thus separate the component 6ª from the component 8ª as before. Upon shifting the lever 30ª to the second speed position (right, forward) the shift rod 32ª would act against the respective pin 41ª and again cause a separation of the component 6ª from its companion 8ª. This separation, upon shifting to the second speed position, can be prevented by omitting the shift pin 41ª from behind the shift rod 32ª.

Instead of making the coupling element 9ª in the shape of a hollow cylinder as in Fig. 1, it is now composed of approximately equal sections 55, 56 (Fig. 11) flanged and bolted together. These sections are tapered in form to agree with the conical shapes of the drive components 6ª, 8ª of the coupling head 7. These conical components establish frictional grips on the sections 55, 56 just as do the base 15 and cone end 24 of the components 6, 8 in Fig. 1.

In lieu of the adjustable bushings 36, 37 (Fig. 2) adjustments between the shift pins 41ª (Figs. 8 and 11) are made by means of caps 57 (Fig. 11), screwed on the threaded ends of the shift rods 32ª, 33ª. Lock nuts 58 secure the caps to their adjustments. The purpose of adjustment at this point in either form is to regulate the instant when the shift rods 32ª, 33ª shall exercise a push on the sleeve 43ª.

The operation is readily understood. The main shaft 1 (Fig. 1) turns clockwise (arrow $a$,) in the forward propulsion of the vehicle. The drive component 6 turns with the shaft 1 by virtue of being splined to it (Fig. 6). The cam face 17 of the component 6 climbs the cam face 18 of the component 8 (arrow $c$, Fig. 1) until the base 15 abuts the plate 11. Further climbing action forces the component 8 forwardly (arrow $d$, Fig. 1) resulting in a wedging of the cone end 24 against the tapering wall 23.

Since the now separated components 6, 8 (dotted line position Fig. 1) are in tight gripping engagement with the element 9, it follows that the clockwise rotation of the main shaft 1 is transmitted to the propeller shaft 12. As long as the components 6, 8 remain thus expanded, the engine and drive wheels of the vehicle operate as a unit.

Assume a slowing down of the shaft 1, or, what would be the same thing, an over-running of the vehicle. Such over-running occurs when the momentum of the vehicle exceeds the delivered speed of the engine. Under the circumstance the plate 11 and coupling element 9 (Fig. 1) would be over-running the drive component 6. The component 8 over-runs with the element 9 by virtue of still being tightly wedged thereagainst. Thus there is a tendency toward a departure of the cam face 18 from the cam face 17.

The spring 16 (Fig. 1) is now free to press the drive component 6 forwardly. This keeps the cam faces 17, 18 together until the teeth 21, 22 again meet and interlock. The superior speed of the component 8 (imparted thereto by the over-riding element 9) becomes checked because said component 8 is now recoupled with the slower main shaft 1. The main shaft and engine now act as a drag on the component 8, causing it to break away from the coupling element 9, leaving the latter free to continue turning at the superior speed which is ultimately traced to the superior momentum of the vehicle.

It can be readily seen that this over-riding or free wheeling function will occur in all forward speeds of the vehicle. Whenever the engine is speeded up there will result an axial separation of the components 6, 8 (Fig. 1) and a consequent gripping of the coupling element 9 so that the vehicle is given a forward impulse. Now when that impulse is converted into a momentum of the vehicle greater than the delivered speed of the engine, the element 9 (and the component 8 for a short while) over-rides the component 6 until the components 6, 8 re-engage, whereupon the engine acts as a drag on the coupling head 7 and causes the component 8 to break away from the element 9, leaving the latter and the vehicle perfectly free to continue motion regardless of the engine and main drive shaft.

The engine and vehicle drive wheels are locked together in second speed in order to utilize the braking effect of the engine in the following manner: Ordinarily in shifting the lever 30 to the second gear position (right, forward) the shoulder 59 (Fig. 2) of the shift rod 32 would merely contact the forward end of the bushing 36 without moving the block 39 (Fig. 1). But provision will be made for a slight additional forward push of the lever 30 from the second speed position, this additional motion displacing the bushing 36 by the contacting shift rod 32 and shifting the block 39 (Fig. 1), pin 41 and sleeve 43, thereby to separate the component 6 from the component 8 and hold the teeth 21, 22 in a non-registering position against the tension of the spring 16. Movement of the block 39, and consequent shifting of the sleeve 43, must not occur until the lever 30 is given the slight additional forward push from the second gear position. The fact of the bushing 36 being shorter than bushing 37 properly accomplishes the purpose.

The spring 16 will be resisted as long as the shift rod 32 remains in the foregoing second speed position; that is to say, the position wherein the slight additional motion was utilized. Turning of the shaft 1 in the clockwise direction (arrow $a$, Fig. 1) causes a jamming of the component 8 inside of the element 9 in the manner already understood. The coupling head 7 and element 9 are thus locked together. Should there be a tendency of the element 9 to over-ride the component 8, as by an increasing momentum of the vehicle, there would be no permissible forward movement of the component 6 under pressure of the spring 16 as before, because the spring 16 is being held in against functioning by the sleeve 43. As a consequence there can be no re-engagement of the teeth 21, 22 and no breaking away of the element 9 from the component 8. The braking effect of the engine will thus always be imposed on the vehicle when the lever 30 has been slightly advanced as stated and while the gears are in the second speed position.

When driving in reverse the action is as follows: When the shift lever 30 is moved to the reverse position, (left, forward) the shift rod 33 (Fig. 2) is moved rearwardly. The bushing 37 is so adjusted that the shoulder 49 makes engagement before the gears are fully meshed. Consequently when the reverse gears are fully meshed, the shift block 39, shift pin 41 and sleeve 43 will have traveled to the rear a distance sufficient to again disengage the teeth 21, 22 (Fig.

1) and hold them in the non-registering position against the tension of the spring 16.

The same expansion and wedging function of the components 6, 8, occurs, locking the element 9 to the coupling head 7 so that the reverse turning of the shaft 1 (arrow b, Fig. 1) causes similar turning of the propeller shaft 12.

This description applies directly to the modified clutch in Fig. 11 with the exception that the engine and drive wheels will be positively locked together every time the second speed position is assumed. This is due to the location of the shift pin 41 behind the shift rod 33. If this locking function is not desired, this particular pin 41 may be omitted in originally assembling the mechanism.

But there is a way of getting around the necessity of omitting the pin 41 from behind the rod 33. Provision can be made for a slight additional forward motion of the lever 30 from the normal second speed position, and the cap 57 can be screwed forwardly far enough so that it will not touch the respective pin 41 when the lever 30 is shifted to the normal second speed position. With such an adjustment of the cap 57, a movement of the lever 30 beyond the normal second speed position would cause action on the respective pin 41 and a forcible displacement of the component 6 against the tension of its spring 16 precisely as already pointed out.

While the construction and arrangement of the improved free wheeling clutch mechanism is that of a generally preferred form, obviously modifications and changes can be made without departing from the spirit of the invention or the scope of the claims.

I claim:

1. A drive shaft operable at selected speeds in one direction, a propeller shaft, and a clutch mechanism interposed between the shafts, said mechanism including means for automatically coupling the shafts together at every one of the selected speeds but automatically uncoupling the shafts when the speed of the propeller shaft exceeds that of the drive shaft; a loose element having means to engage the clutch mechanism and adapted to prevent it from uncoupling at a selected one of the speeds, thus to keep the shafts locked together, and a shiftable element which is selectively operable in one direction to maintain said loose element in the clutch engaging position and prevent uncoupling of the shafts at a selected coupling period, and means to loosen up on said loose element upon operation of said shiftable element in the other direction to enable uncoupling as in the remaining coupling periods.

2. The combination of a drive shaft, a driven shaft, a clutch mechanism interposed between the shafts including a coupling element carried by one of the shafts having a tapering wall, a correspondingly tapering coupling component loosely carried by the other shaft, and operating means slidably carried by said other shaft, said operating means and coupling component having cam faces for first sliding said operating means into abutting relationship with the coupling element, then driving said component into wedging engagement with said wall during a preponderance of speed of the drive shaft.

3. The combination of a drive shaft, a driven shaft, a clutch mechanism interposed between the shafts including a coupling element carried by one of the shafts, a coupling head carried by the other shaft having separate components with contacting cam faces for causing separation of the components and a gripping engagement thereof with said element upon a preponderance of drive shaft speed, one of said components being loose and the other splined on said other shaft, teeth on the respective components disengaged from each other when said components are separated, and means to move the splined component toward its companion upon an excess of driven shaft speed, thus to engage the teeth and cause said companion to break away from the coupling element.

4. The combination of a drive shaft, a driven shaft, a clutch mechanism interposed between the shafts including a coupling element carried by one of the shafts, a coupling head composed of separable components carried by the other shaft, said components having interacting cam faces, resilient means tending to resist the separation of one of the components by action of the cam faces whereby gripping engagement of the coupling head is established with the coupling element upon a preponderance of drive shaft speed, and means to hold said one component in the separated position against said resilient means thus to maintain said gripping engagement.

5. A drive shaft, a driven shaft, a clutch mechanism interposed between the shafts including a coupling element carried by one of the shafts, a coupling head carried by the other shaft comprising components that are separable to grip said element upon revolution of the drive shaft thus to revolve the driven shaft, and means operable relatively to said coupling element to hold the components of the coupling head in a separated position, thus to maintain the grip of the coupling head on said element.

6. A clutch mechanism comprising a pair of shafts, a coupling element, means by which the element is fixedly mounted on one of said pairs of shafts, a coupling head mounted on the other shaft, said head including a drive component splined to said shaft and a companion drive component loose on said shaft, said components having co-acting cam faces and teeth, resiliently operable means carried by said other shaft tending to press the components together and to press said loose component against the coupling element, a sleeve having means to engage a part of the splined component, and means to shift the sleeve in reference to said element thus to depress said splined component against the pressure of said resiliently operable means.

7. A clutch mechanism comprising a pair of shafts, a coupling element to be carried by one of said pair of shafts, a separable coupling head carried by the other shaft, said head comprising splined and loose components having interacting cam faces and teeth, said splined component having a shoulder, resiliently operable means carried by the other shaft tending to press the components together and the head into contact with said element, a sleeve having a pusher engaging the shoulder, a shift pin to move the sleeve, a block to actuate the shift pin, an adjustable means carried by the block being movable to cause shifting of the sleeve to maintain the splined component in a separated position against the pressure of its resiliently operable means.

8. A clutch mechanism comprising a pair of shafts, a coupling component connectible with one of said pairs of shafts, a coupling head to be carried by the other shaft, said head comprising splined and loose components having inter-acting cam faces and teeth, resiliently operable means carried by the other shaft tending to press the components together and the head in contact with said element, a sleeve engaging part of the splined component, a cylindrical cup shiftable in reference to said element, a stud carried by the cup engaging part of the sleeve, a shift pin engaging part of the cup, and means to move the shift pin thereby to ultimately slide the sleeve and hold the splined component in the separated position against the pressure of its resiliently operable means.

9. Drive and driven shafts, a coupling element carried by one of the shafts, coupling means comprising two components, one of the components being movable with and the other component being loose on the other shaft, and separating means between the two components to jam the components against the coupling element upon a predominance of turning speed of the drive over the driven shaft.

10. Drive and driven shafts, a coupling element carried by one of the shafts, coupling means comprising two components on the other shaft one of the components being loose, confronting cam surfaces on the two components, and means compelling one of the components to turn with said other shaft.

11. Drive and driven shafts, a coupling element carried by one of the shafts, coupling means comprising two components on the other shafts, one of the components being loose and the other component slidably keyed to said other shaft, separating means between the two components mutually coacting to jam the components against the coupling element upon acceleration of the drive shaft, and lock-out means to hold the two components apart and locked in the jammed position.

12. Drive and driven shafts, a coupling element carried by one of the shafts, coupling means comprising two components on the other shaft, one of the components being loose and the other component movable with said other shaft, separating means between the two components mutually coacting to jam the components against the coupling element upon acceleration of the drive shaft, lock-out means to hold the two components apart and locked in the jammed position, and actuating means for the lock-out means comprising a lever, and a connection between the lever and lock-out means.

CURTIS D. BAILEY.